US012600471B2

(12) United States Patent
    Yingling

(10) Patent No.:     US 12,600,471 B2
(45) Date of Patent:        Apr. 14, 2026

(54) WING MECHANISM

(71) Applicant: Adam Yingling, Burke, VA (US)

(72) Inventor:  Adam Yingling, Burke, VA (US)

( * ) Notice:    Subject to any disclaimer, the term of this
                 patent is extended or adjusted under 35
                 U.S.C. 154(b) by 123 days.

(21) Appl. No.: 18/793,577

(22) Filed:     Aug. 2, 2024

(65)                Prior Publication Data

US 2026/0035070 A1      Feb. 5, 2026

(51) Int. Cl.
    *B64C 33/02*          (2006.01)
(52) U.S. Cl.
    CPC .................................... *B64C 33/02* (2013.01)
(58) Field of Classification Search
    CPC ........ B64C 33/00; B64C 33/02; B64C 33/025
    See application file for complete search history.

(56)                References Cited

U.S. PATENT DOCUMENTS 6,206,324 B1 *  3/2001  Smith ..................... B64C 33/02
                                                         244/72
       9,428,269 B1 *  8/2016  Oppenheimer ....... B64C 33/025
    2022/0274698 A1 *  9/2022  Deng ..................... H02K 7/003
    2024/0101237 A1 *  3/2024  Podhola ................... B63H 9/08

FOREIGN PATENT DOCUMENTS

| CN | 105799932 | A | * | 7/2016 | |
| CN | 107472528 | A | * | 12/2017 | ............. B64C 33/02 |
| CN | 108454850 | A | * | 8/2018 | ............. B64C 33/00 |
| CN | 111645857 | A | * | 9/2020 | ............. B64C 33/02 |
| CN | 112937854 | A | * | 6/2021 | |
| CN | 113859531 | A | * | 12/2021 | ............. B64C 33/02 |
| CN | 114537659 | A | * | 5/2022 | |
| CN | 118004443 | A | * | 5/2024 | |
| CN | 118062234 | A | * | 5/2024 | ............. B64C 33/02 |
| DE | 202007018524 | U1 | * | 12/2008 | ............. B63H 3/002 |
| GB | 2433059 | A | * | 6/2007 | ........... A63H 27/008 |
| GB | 2549252 | A | * | 10/2017 | ........... B64C 39/003 |
| KR | 20220068580 | A | * | 5/2022 | |
| WO | WO-2019235972 | A1 | * | 12/2019 | ........... A63H 27/008 |
| WO | WO-2022038505 | A1 | * | 2/2022 | |

* cited by examiner

*Primary Examiner* — Joseph W Sanderson
(74) *Attorney, Agent, or Firm* — Clement Cheng

(57)                ABSTRACT

A wing mechanism includes a first actuator, a second actua-
tor, and a third actuator that all extend from a substrate and
connect to the upper junction member. The wing is con-
nected to the upper junction member. The wing has a wing
base with a main spar mounted to the wing base. The wing
base has a middle spar mounted to the wing base behind the
main spar. The wing base has a trailing edge member
mounted to the wing base behind the middle spar. The wing
base has a backer spar mounted to the wing base behind the
main spar.

20 Claims, 21 Drawing Sheets

WING MECHANISM

FIELD OF THE INVENTION

The present invention is in the field of wing mechanisms.

DISCUSSION OF RELATED ART

A variety of different wing mechanisms can power flapping wing propulsion such as shown in U.S. Pat. No. 9,745,058 issued Aug. 29, 2017 to first inventor Kuroda entitled Ornithopter. The abstract of which describes the actuator as, "The control system includes an actuator which performs a raising motion and a lowering motion of the inner spar by moving the inner spar in an upward direction and in a downward direction, an angle sensor which measures the bending angle, and a control unit which controls the actuator to move the inner spar in response to the measured bending angle."

Also as shown in U.S. Pat. No. 6,544,094, entitled toward Ornithopter aircraft by first inventor Eric Edward Thomas, issued Apr. 8, 2003, describes the wing mechanism in the abstract as, "The flapping wings pivot at the inner ends both to a pin on the airframe. Connecting-rods go from the crankshaft to intermediate points on the wings."

As described in U.S. Pat. No. 9,290,268 issued Mar. 26, 2016 by inventor Ratti, the abstract describes the wing mechanism as, "The wings can be controlled by a gear train, coil-magnet arrangement or many other actuation systems that enable variable frequency flapping, variable amplitude flapping, or a combination of both." Additionally, Lego has a Dune Atreides Royal Ornithopter comprising a 1369 piece model ornithopter with moving wings. The above disclosures are incorporated herein by reference.

SUMMARY OF THE INVENTION

A wing mechanism includes a first actuator, a second actuator, and a third actuator that all extend from a substrate and connect to the upper junction member. The wing is connected to the upper junction member. The wing has a wing base with a main spar mounted to the wing base. The wing base has a middle spar mounted to the wing base behind the main spar. The wing base has a trailing edge member mounted to the wing base behind the middle spar. The wing base has a backer spar mounted to the wing base behind the main spar.

The first actuator, the second actuator, and the third actuator all include a lower universal joint and an upper universal joint such that the first actuator has a first actuator lower universal joint and a first actuator upper universal joint, the second actuator has a second actuator lower universal joint and a second actuator upper universal joint, and the third actuator has a third actuator lower universal joint and a third actuator upper universal joint. The median line extends from a surface of the substrate and passes between the first actuator, the second actuator, and the third actuator to the upper junction member. The median line extends to the upper junction member. The wing is within 20 degrees of a right angle to the median line when in a neutral position.

The wing mechanism optionally includes a first actuator line that passes through the first actuator and makes a first actuator angle that is acute and angled toward the median line. The second actuator line passes through the second actuator and makes a second actuator angle that is acute and angled toward the median line. The third actuator line passes through the third actuator and makes a third actuator angle that is acute and angled toward the median line. A fourth actuator is mounted next to the first actuator. A fifth actuator is mounted next to the second actuator. A sixth actuator is mounted next to the third actuator. The fourth actuator, the fifth actuator, and the sixth actuator are connected to the upper junction member. The controller controls the motion of the actuator to flap the wing. The actuator assembly is preferably electrically connected to the controller. The electronic controller may have a CPU and database and memory or the like.

BRIEF DESCRIPTION OF THE DRAWINGS

FIG. 18 is a top view of the wing up position zoomed in.

Figure 1:
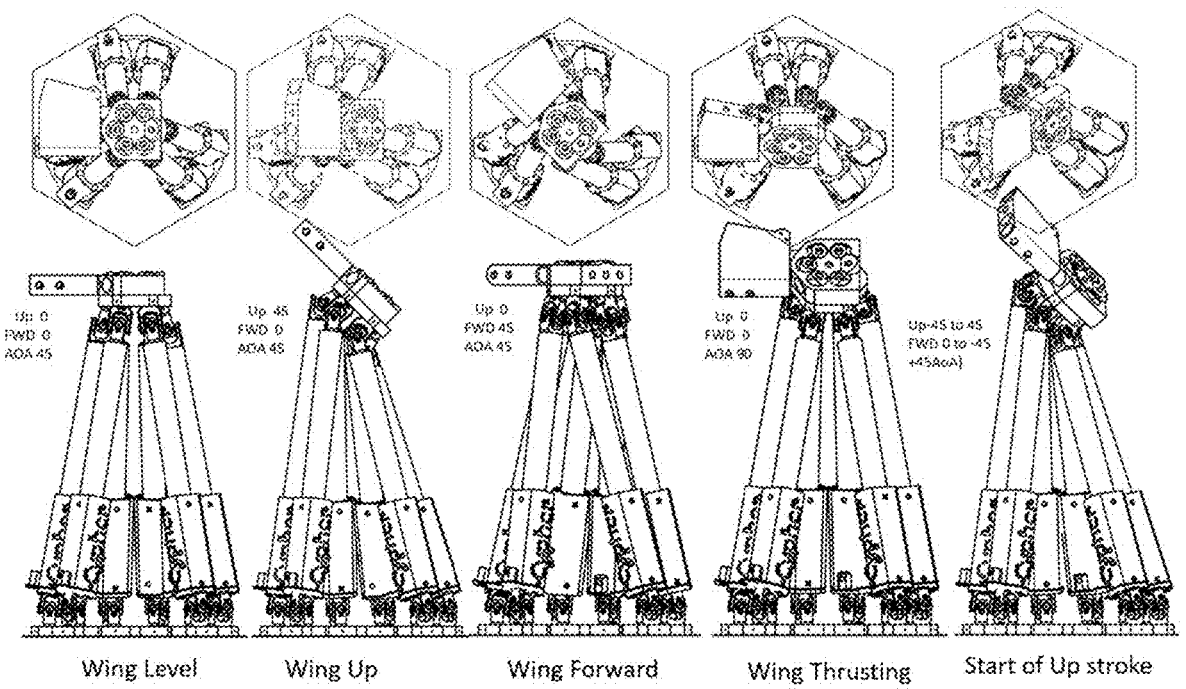
FIG. 1 is a diagram showing five phases of the flapping wing mechanism.

The following elements can be a useful guide in referencing the element numbers of the drawings.

20 wing
21 main spar
22 backer spar
23 middle spar
24 trailing edge member
25 loop back connection
26 main spar connector
27 wing base
28 main spar connection
29 middle spar connection
30 backer spar connection
31 training edge connection
32 main spar tip
33 backer spar tip
34 middle spar tip
35 wing distal tip
36 wing junction connectors 37 first wing junction connector
38 second wing junction connector
39 third wing junction connector
40 actuator assembly
41 first actuator
42 second actuator
43 third actuator
44 fourth actuator
45 fifth actuator
46 sixth actuator
50 upper junction member
51 first junction mount
52 second junction mount
53 third junction mount
54 fourth junction mount
55 fifth junction mount
56 sixth junction mound
57 upper junction block
58 lower junction block
60 universal joint
61 cross bar
62 upper yoke
63 lower yoke
64 first crossbar extension
65 second crossbar extension
66 third crossbar extension
67 fourth crossbar extension
68 upper yoke sockets
69 lower yoke sockets
70 lower universal joint
71 substrate base
72 substrate base mount block
73 lower joint
74 upper joints
86 actuator line
87 substrate plane
88 median line
89 actuator angle

DETAILED DESCRIPTION OF THE PREFERRED EMBODIMENT

As seen in FIG. 1, the five phases include from right to left the start up of the upstroke position, then the wing thrusting position, then the wing forward position, then the wing up position, and then the wing level position.

Figure 2:
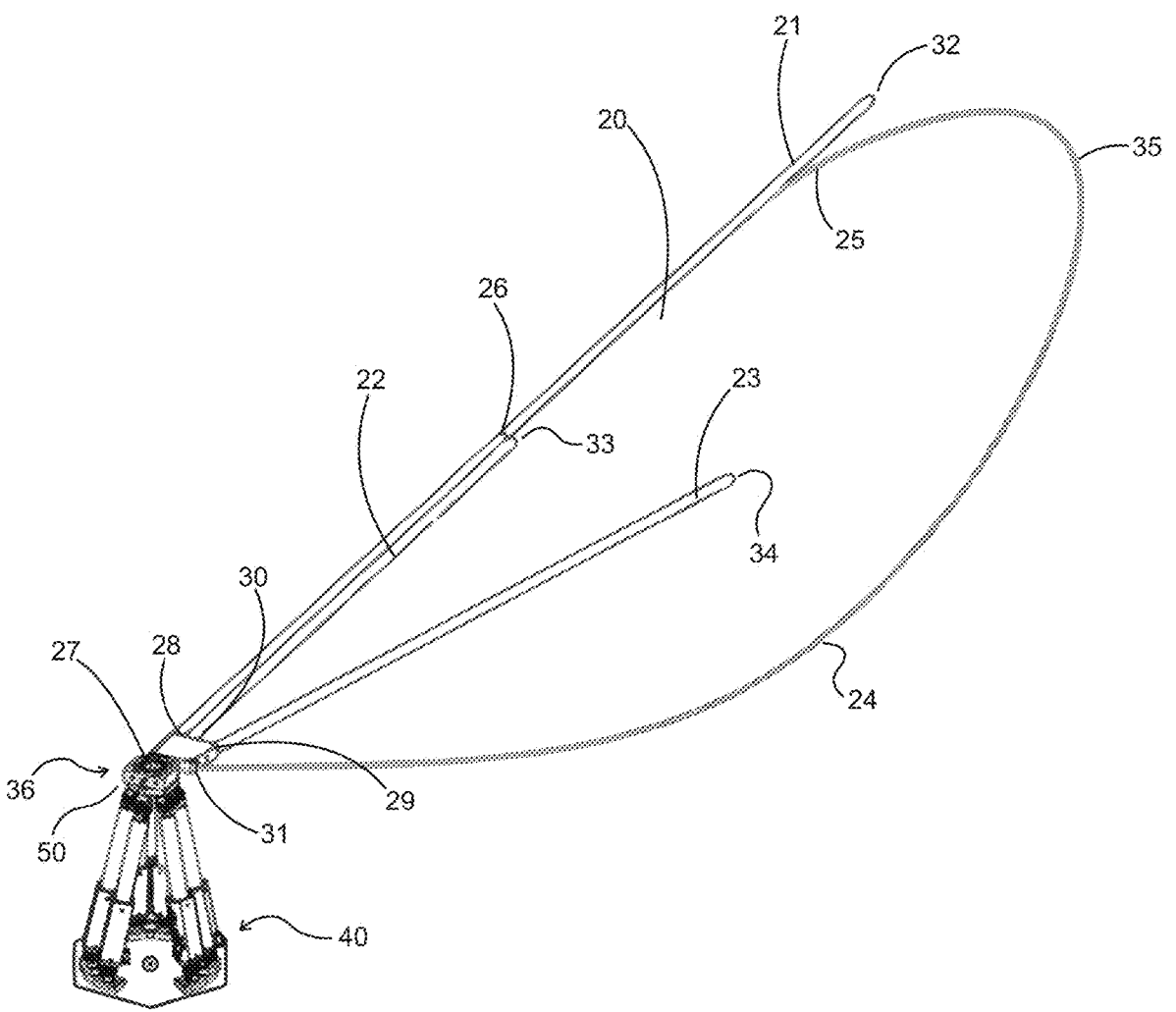
FIG. 2 is a diagram showing the wing and actuator assembly in an isometric view.

As seen in FIG. 2, the wing mechanism includes a wing 20 that connects to actuator assembly 40 at an upper junction member 50. The wing 20 has a main spar 21, a backer spar 22, and a middle spar 23 with a trailing edge member 24. The trailing edge member 24 is preferably resilient flexible and bendable. The backer spar 22 can be approximately half the length of the main spar 21 and optionally be connected to the main spar at a main spar connector 26 for example, which could be a strap for example. The trailing edge member can connect to the wing base 27 at the trailing edge connection 31, then loop back at the trailing edge member trailing edge portion until a wing distal tip 35. After the wing distal tip 35, the trailing edge member 24 can loop back to connect to the main spar 21 at a loopback connection 25. The loopback connection 25 connects to the main spar 21 at a generally parallel configuration. The main spar 21 makes a main spar connection 28 to the wing base 27. The backer spar 22 makes a backer spar connection 32 the wing base 27. The middle spar 23 makes a middle spar connection 29 to the wing base 27. The main spar 21 can be formed as a carbon fiber shaft or tube having a main spar tip 32. The middle spar 23 may have a middle spar tip 34. The backer spar 22 may have a backer spar tip 33.

The wing base 27 connects to the actuator assembly 50 at the upper junction member 50. The actuator assembly 40 has multiple positions and is made of multiple linear actuators. each linear actuator changes an angle of the upper junction number 50. The main spar connection 28, the backer spar connection 30, and the middle spar connection 29 all connect to the wing base 27 at a distal end of the wing base 27.

Figure 3:
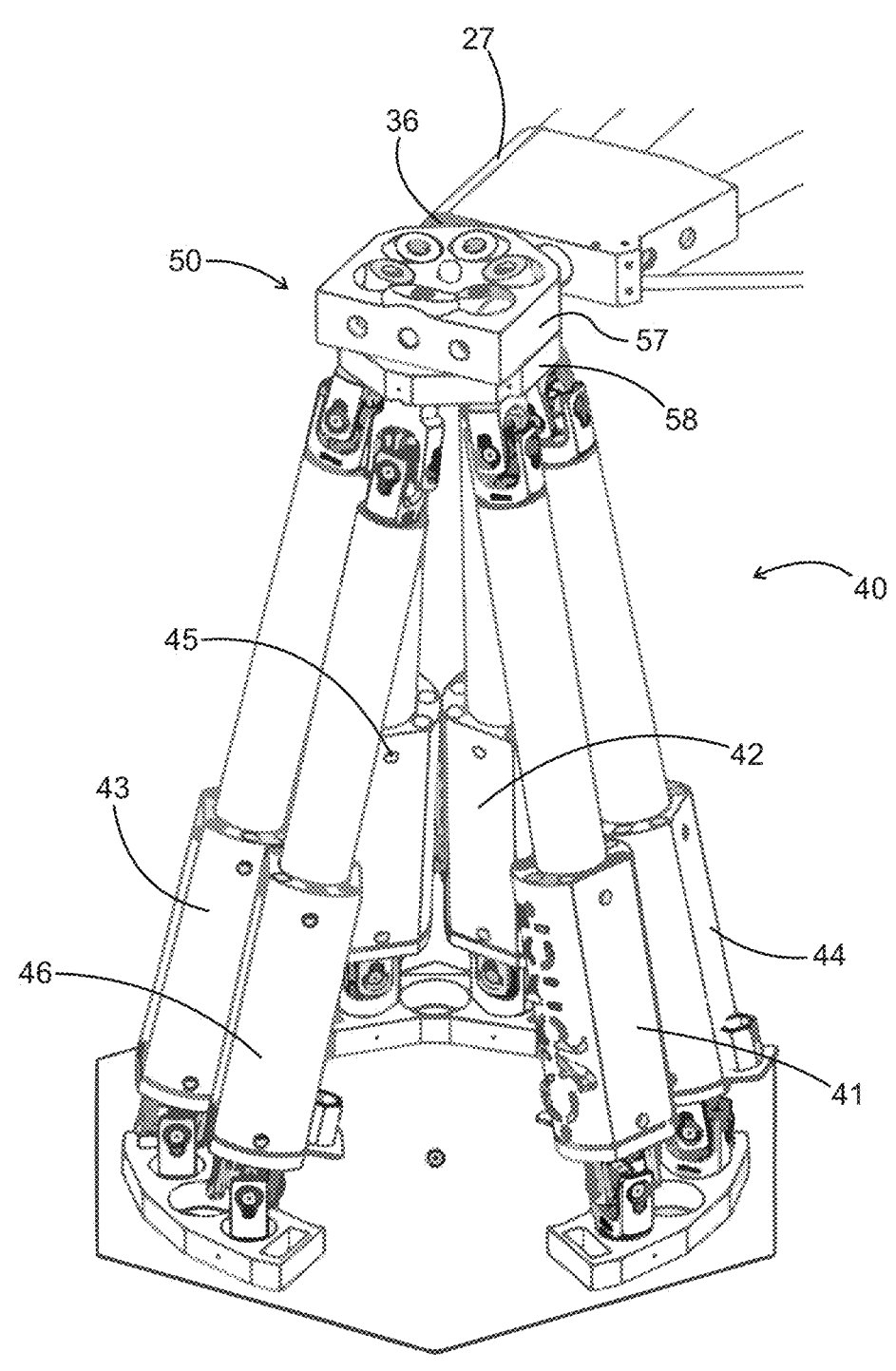
FIG. 3 is a diagram showing the actuator assembly detail and connection to wing base.

As seen in FIG. 3, the wing base 27 connects to the upper junction member 50 using wing junction connectors 36. The upper junction member 50 can be constructed of an upper junction block 57 and a lower junction block 58. The upper junction block 57 can connect to the wing junction connectors 36. The wing junction connectors can be formed as horizontal tubes.

The upper junction member 50 changes angle according to the actuators on the actuator assembly 40. The actuator assembly 40 pitches and rolls the upper junction member 50. The first actuator 41, the second actuator 42, and the third actuator 43 are preferably oriented at 120 degrees from each other. Optionally, the fourth actuator 44, the fifth actuator 45, and the sixth actuator 46 can be implemented adjacent to the first actuator 41, the second actuator 42, and the third actuator 43. The fourth actuator 44, the fifth actuator 45, and the sixth actuator 46 are also preferably at 120 degrees from each other. The linear actuators can be electrically powered and or hydraulically powered for example. The linear actuators lean in toward each other so that the upper junction member is preferably at a centerline of the linear actuators.

Figure 4:
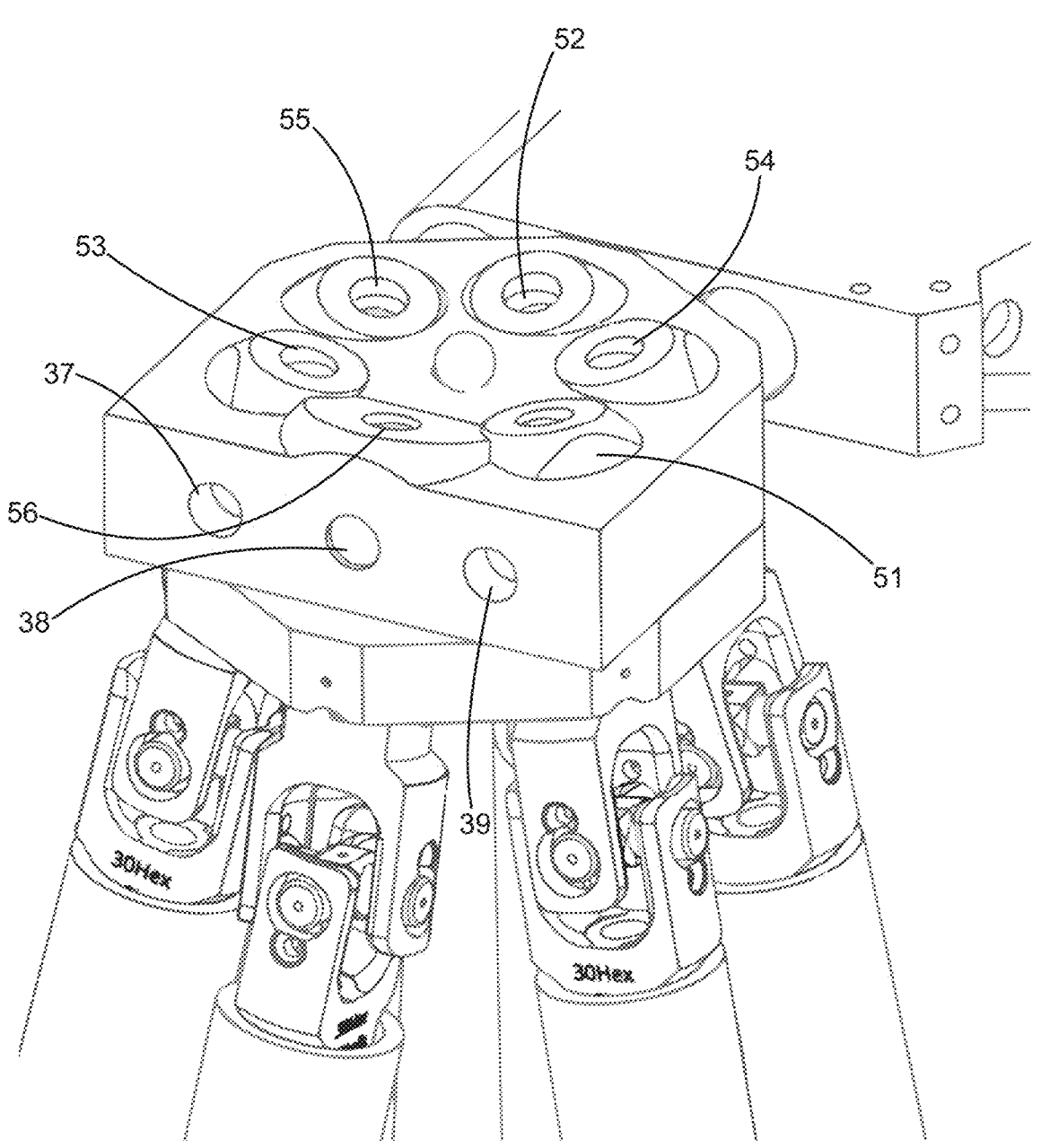
FIG. 4 is a diagram showing the junction connector detail.

As seen in FIG. 4, the linear actuators connect to the upper junction member 50 at junction mounts. The junction mounts can include a first junction mount 51, a second junction mount 52, and a third junction mount 53 which are spaced apart at 120 degrees from each other. Additionally, a fourth junction mount 54, a fifth junction mount 55, and a sixth junction mount 56 are also preferably at 120 degrees from each other and can be adjacent to the first junction mount 51, the second junction mount 52 and the third junction mount 53 respectively. The first wing junction connector 37, the second wing junction connector 38, and the third wing junction connector 39 can be formed as openings that retain shafts that pass through the upper junction member 50 and connect to the wing base 27.

Figure 5:
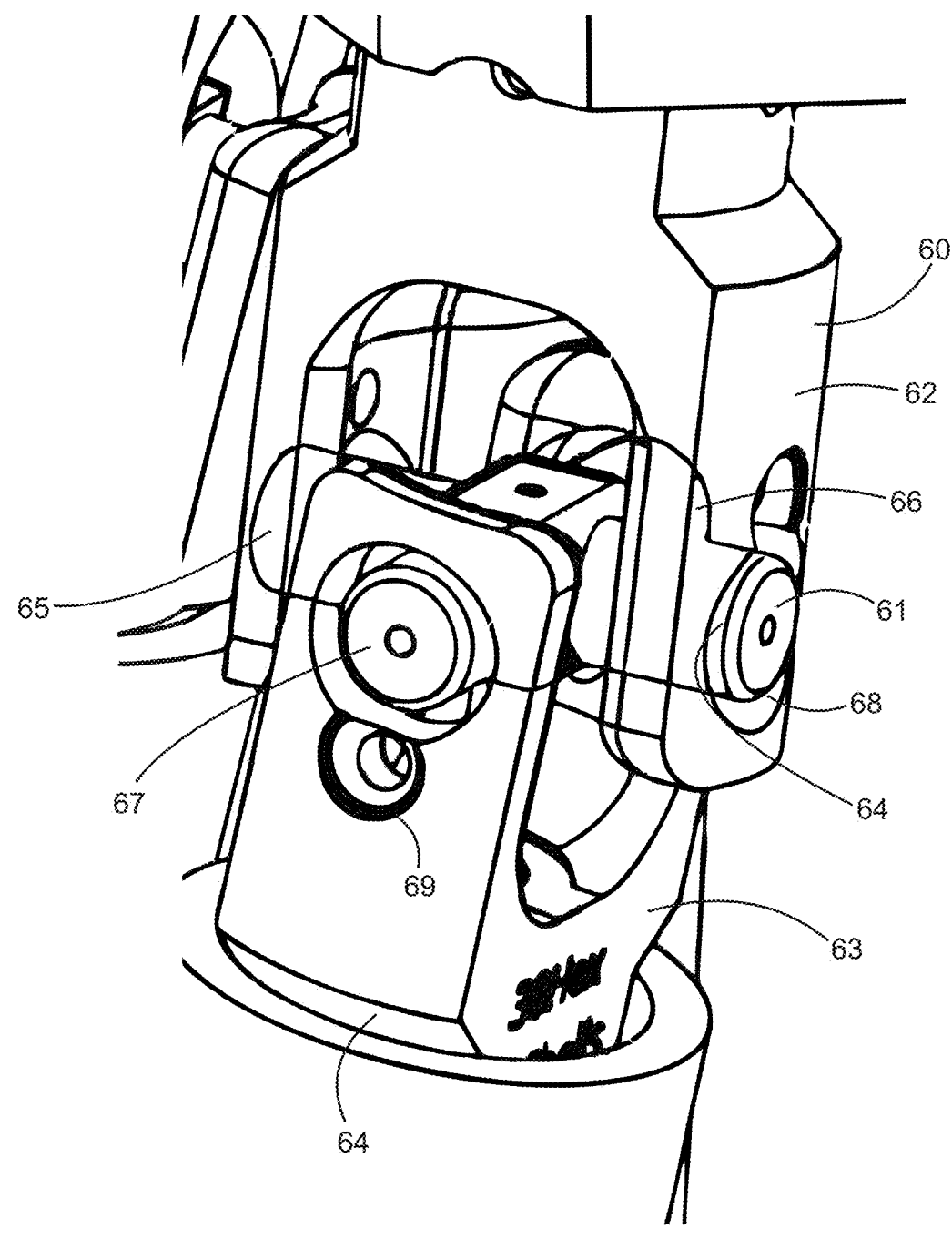
FIG. 5 is a diagram showing a close up view of the universal joint with the crossbar highlighted.

As seen in FIG. 5, the universal joint 60 can be formed at an upper end of the linear actuators and at a lower end of the linear actuators. The universal joint 60 preferably includes an upper yoke 62 and a lower yoke 63. The upper yoke 62 has upper yoke sockets 68 which receive a first crossbar extension 64 and a second crossbar extension 65. The universal joint 60 also includes a lower yoke 63 with lower yoke sockets 69. The lower yoke sockets 69 retain the third crossbar extension 66 and the fourth crossbar extension 67. The crossbar 61 has a first crossbar extension 64, a second crossbar extension 65, a third crossbar extension 66 and a fourth crossbar extension 67 all protruding at right angles from each other.

Figure 6:
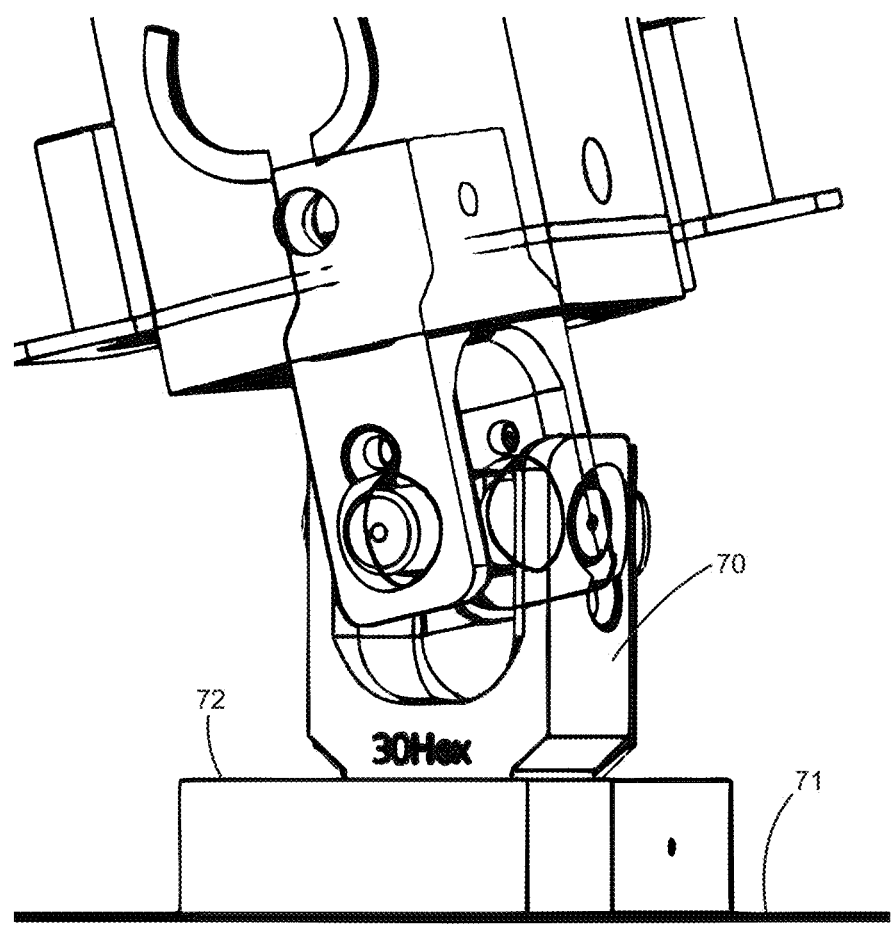
FIG. 6 is a diagram showing the lower light of the actuator with a universal threat into the upper arm.

As seen in FIG. 6, the substrate base 71 can be a part of the airframe of the flying vehicle or flying device. The substrate base 71 receives a substrate base mount block. The substrate base mount block 72 receives the lower universal joint 70. The construction of the lower universal joint 70 can have the same structure as the universal joint 60 previously described in FIG. 5.

Figure 7:
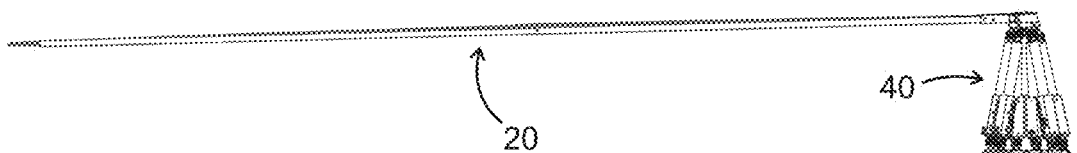
FIG. 7 is a close-up view diagram of the lower universal joint.
Figure 8:
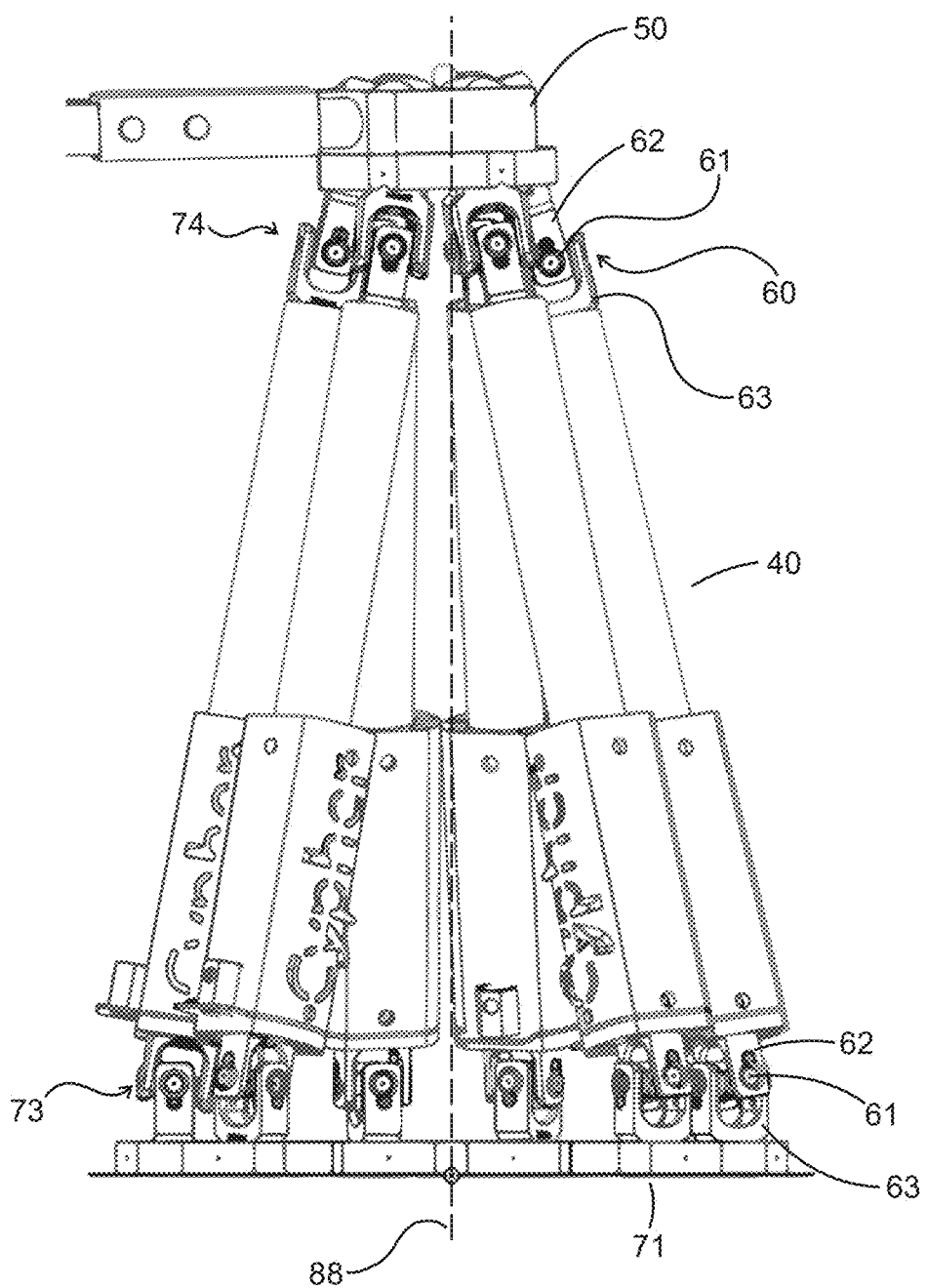
FIG. 8 is a diagram showing the media line with a level wing configuration position.
Figure 9:
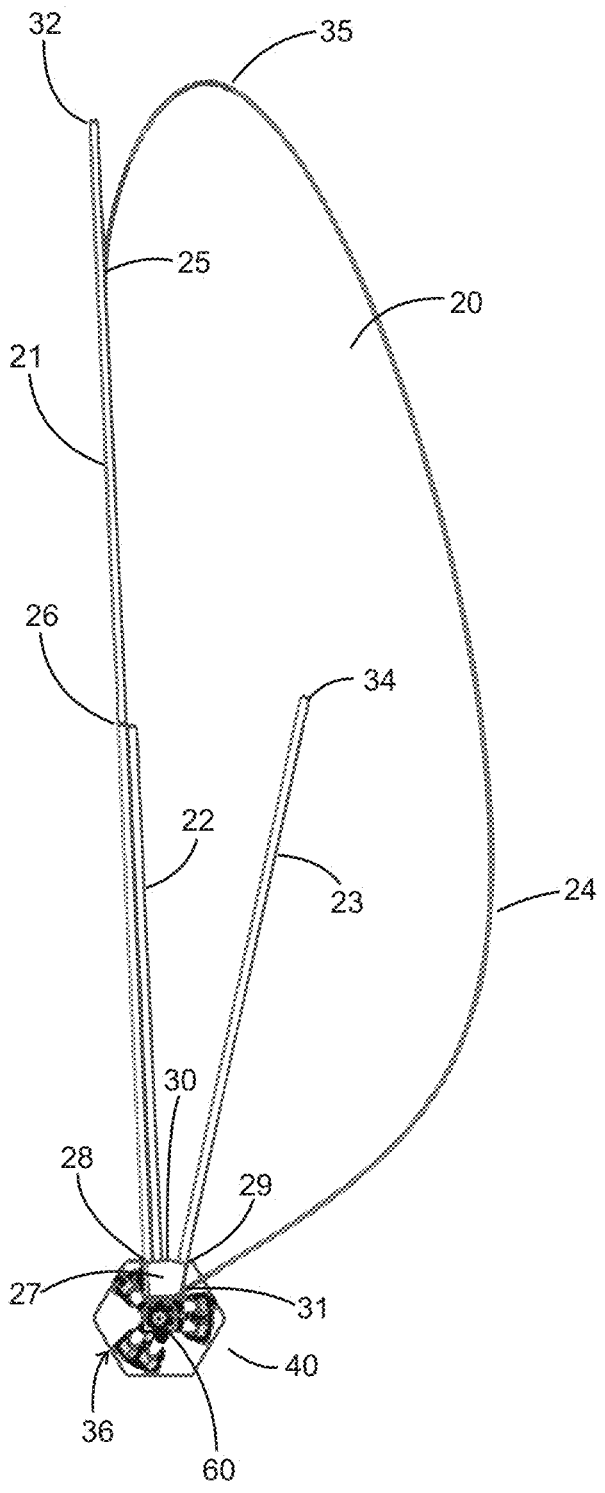
FIG. 9 is a top view of a level wing position which is the neutral position.
Figure 10:
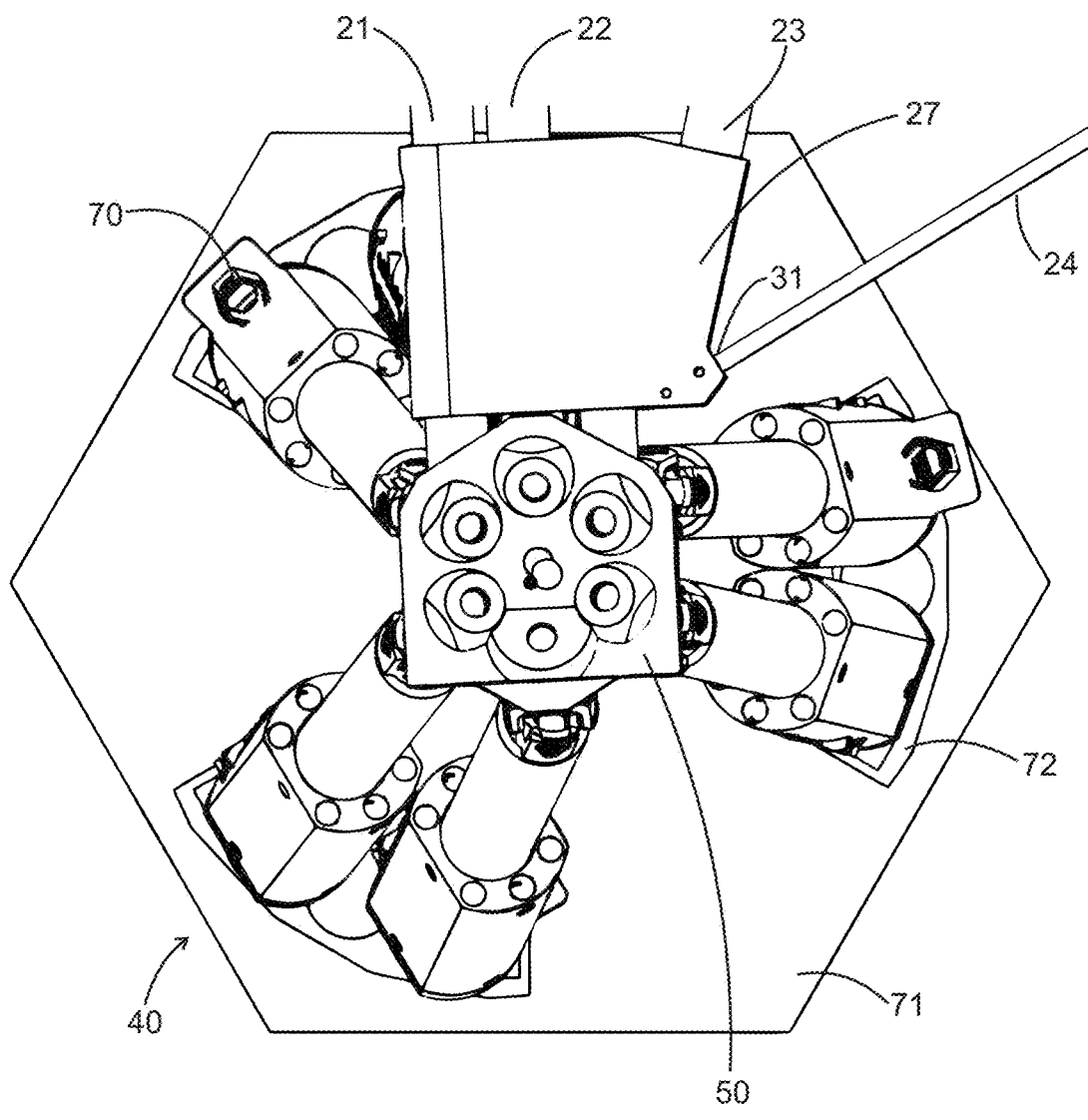
FIG. 10 is a top view of the wings in a zoomed in position.
Figure 11:
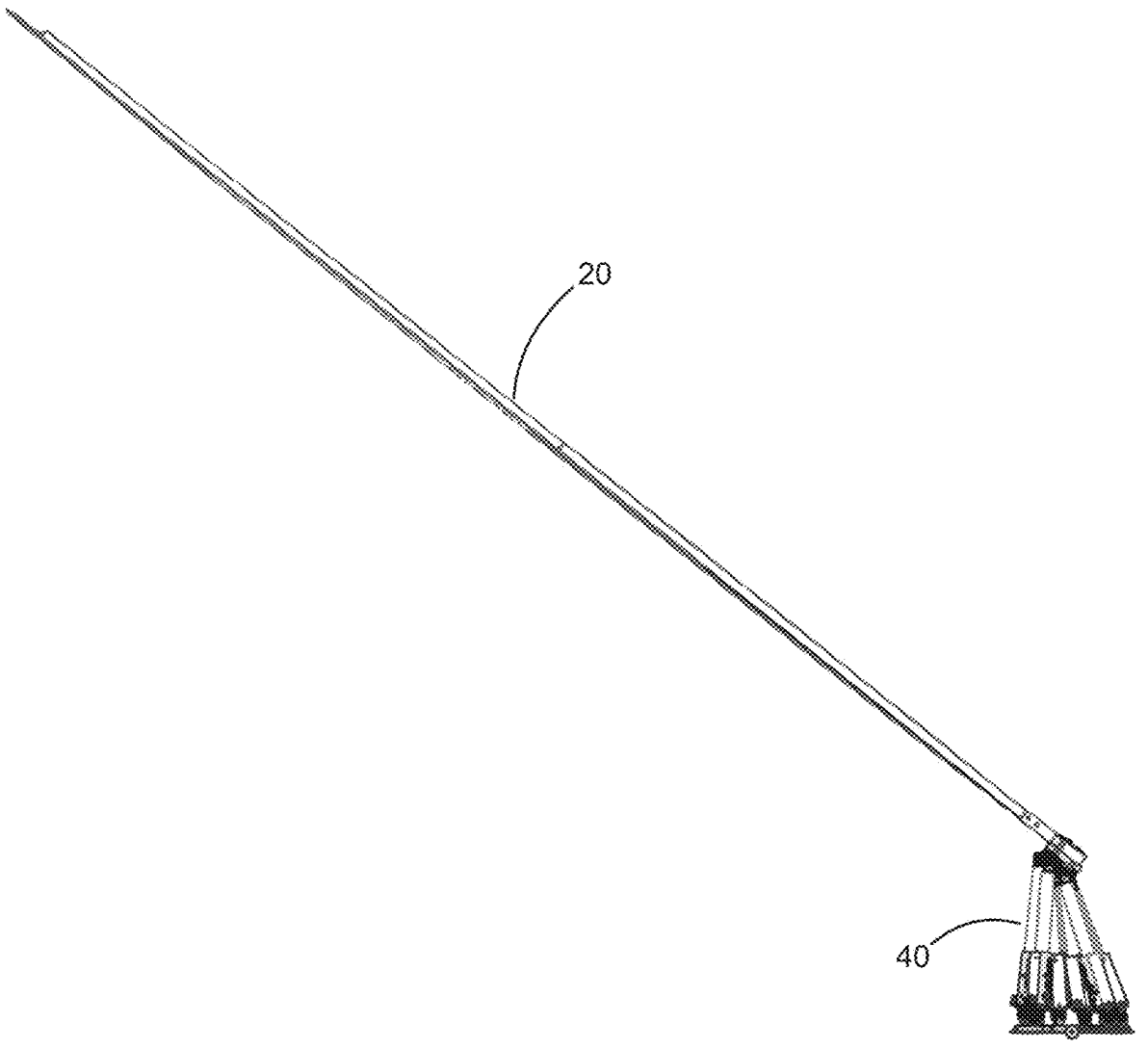
FIG. 11 is a left view of a wing up position.
Figure 12:
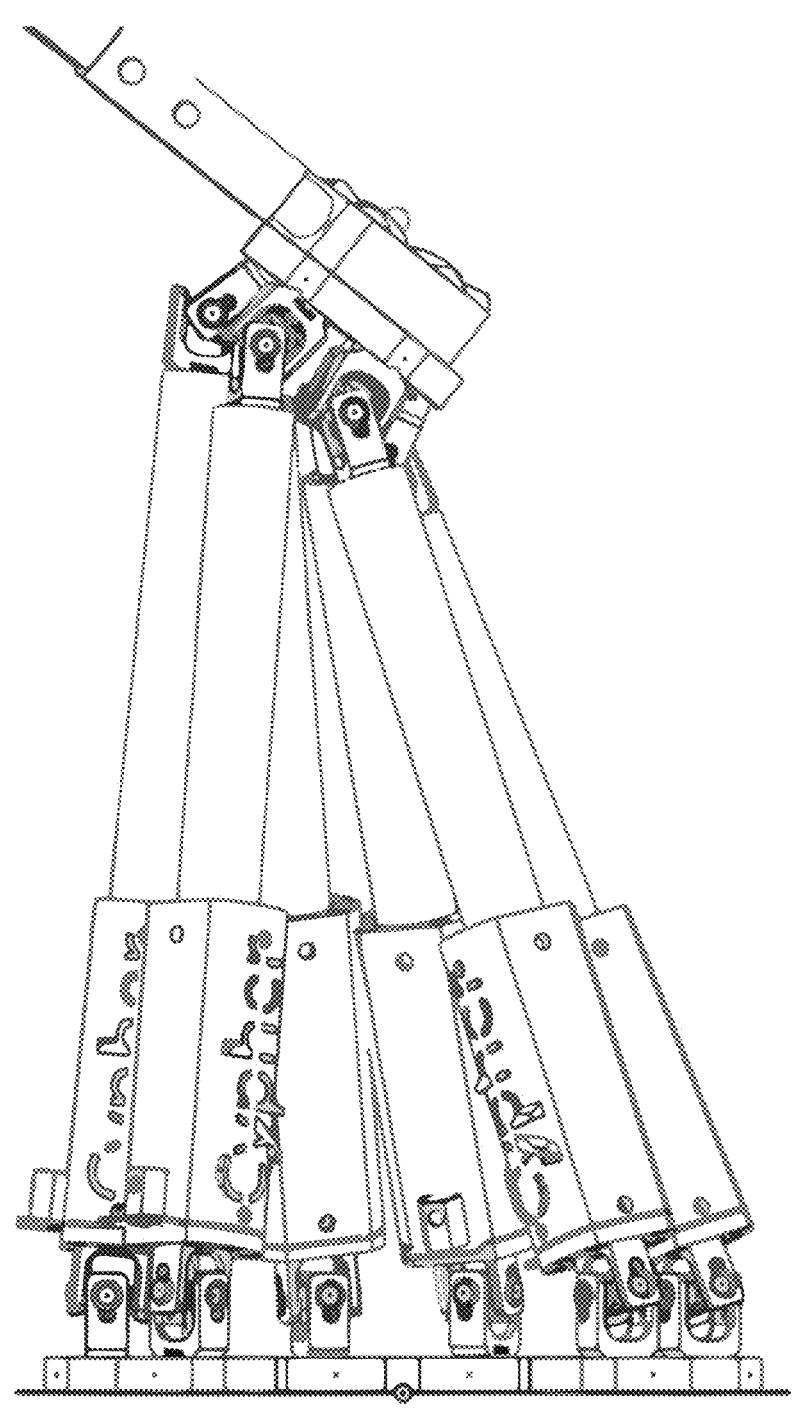
FIG. 12 is a left view of the wind up zoomed in position.
Figure 13:
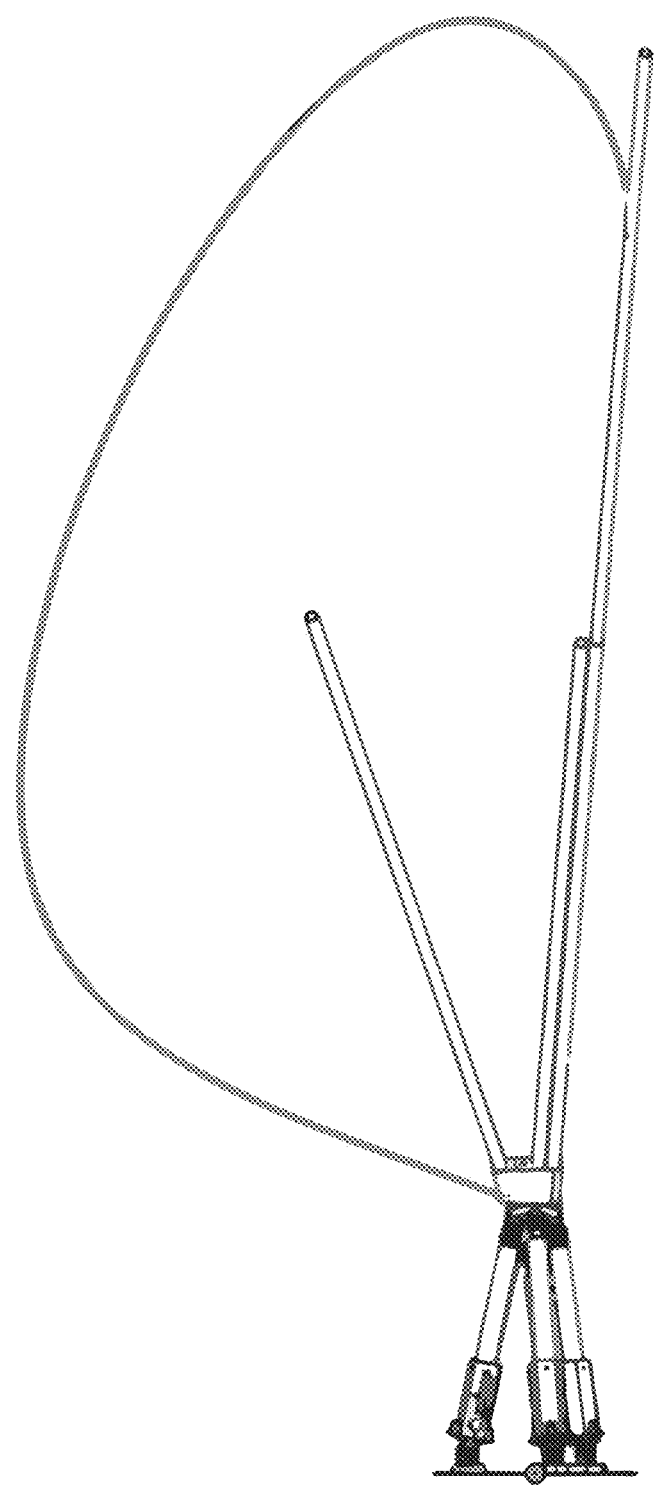
FIG. 13 is a back view of the wing up position.
Figure 14:
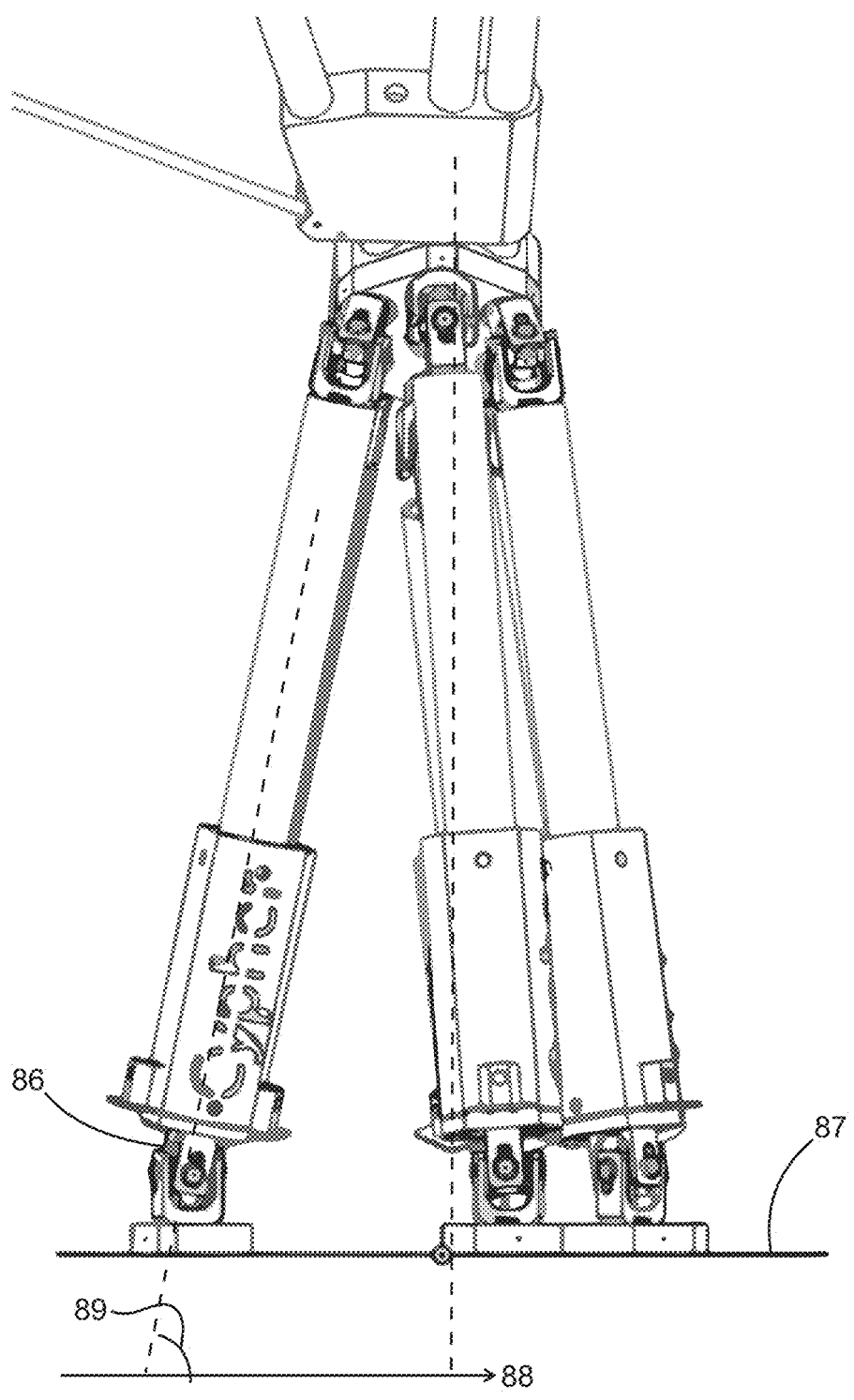
FIG. 14 is a diagram showing an actuator angle.
Figure 15:
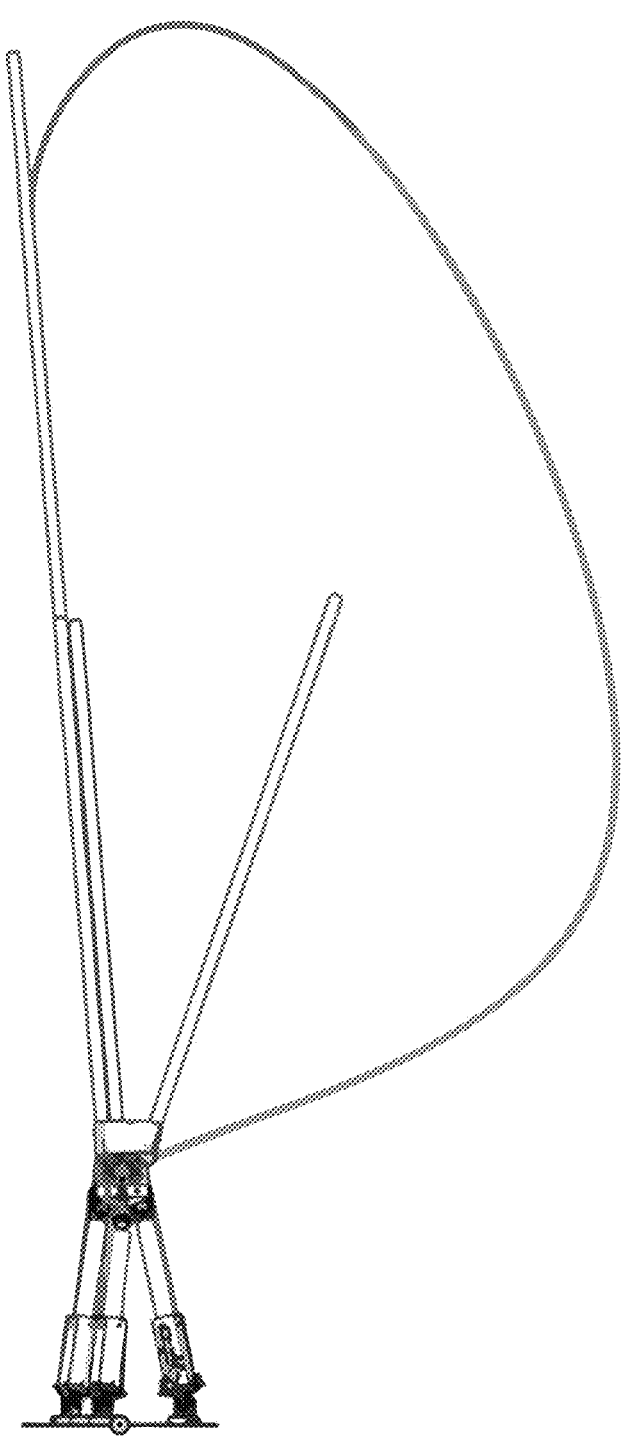
FIG. 15 is a diagram showing a front view of the wing up position.
Figure 16:
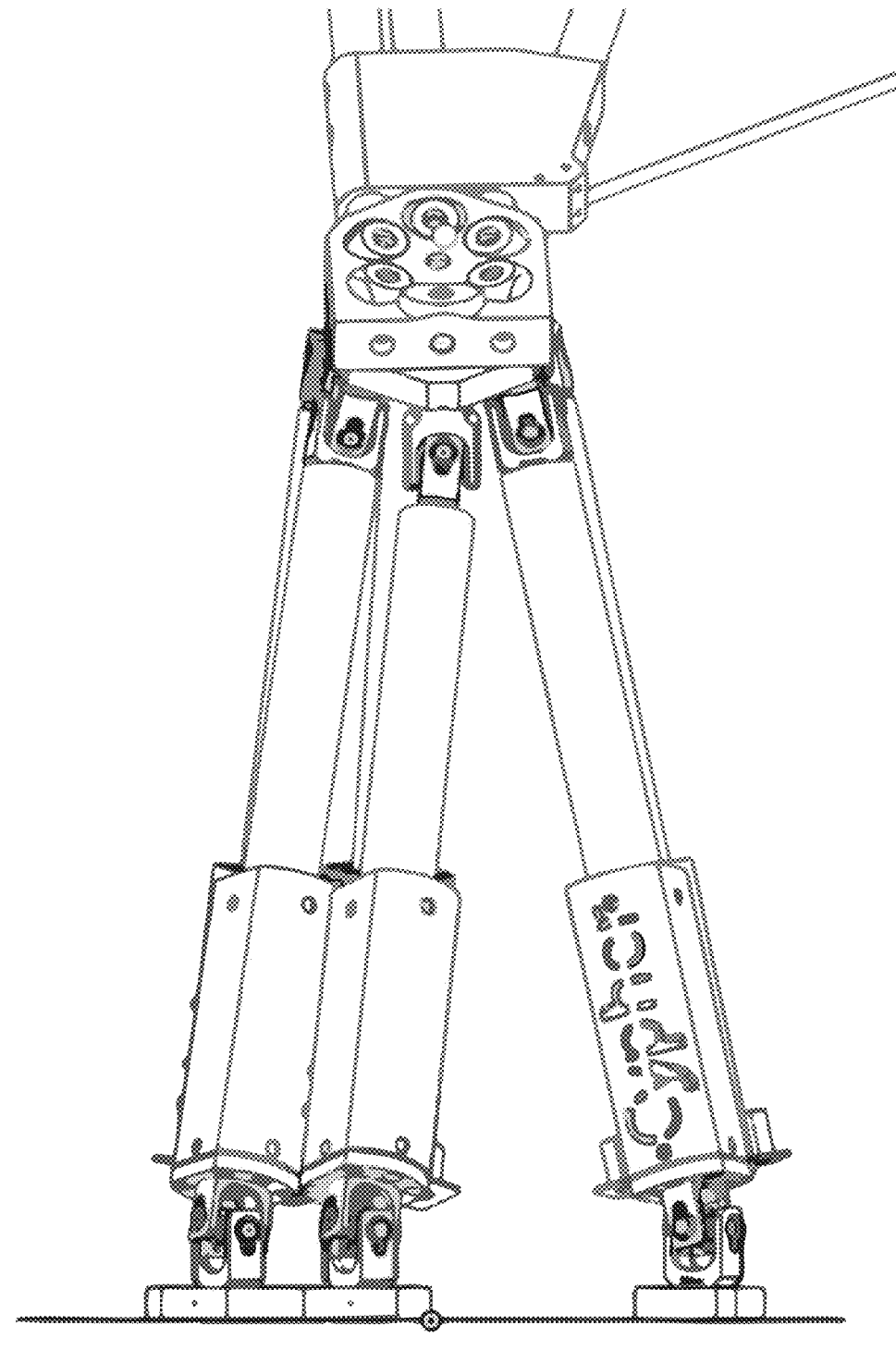
FIG. 16 is a front view of the wind up position showing a zoomed in actuator.
Figure 17:
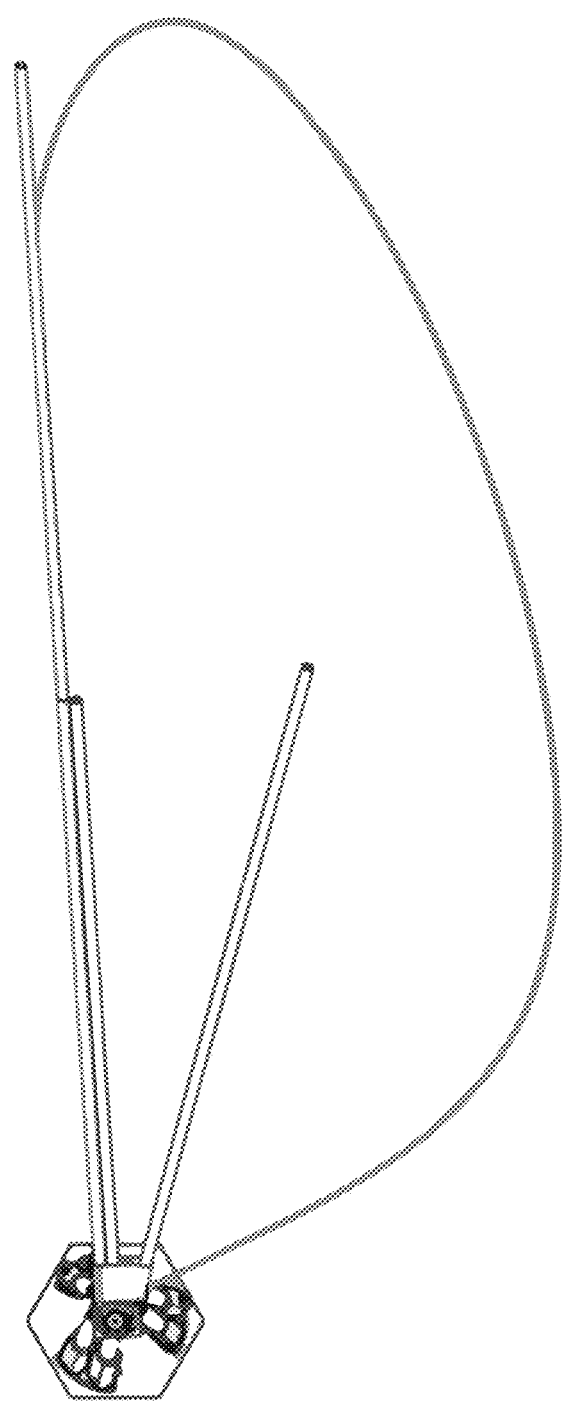
FIG. 17 is a top view of a wing up position.
Figure 18:
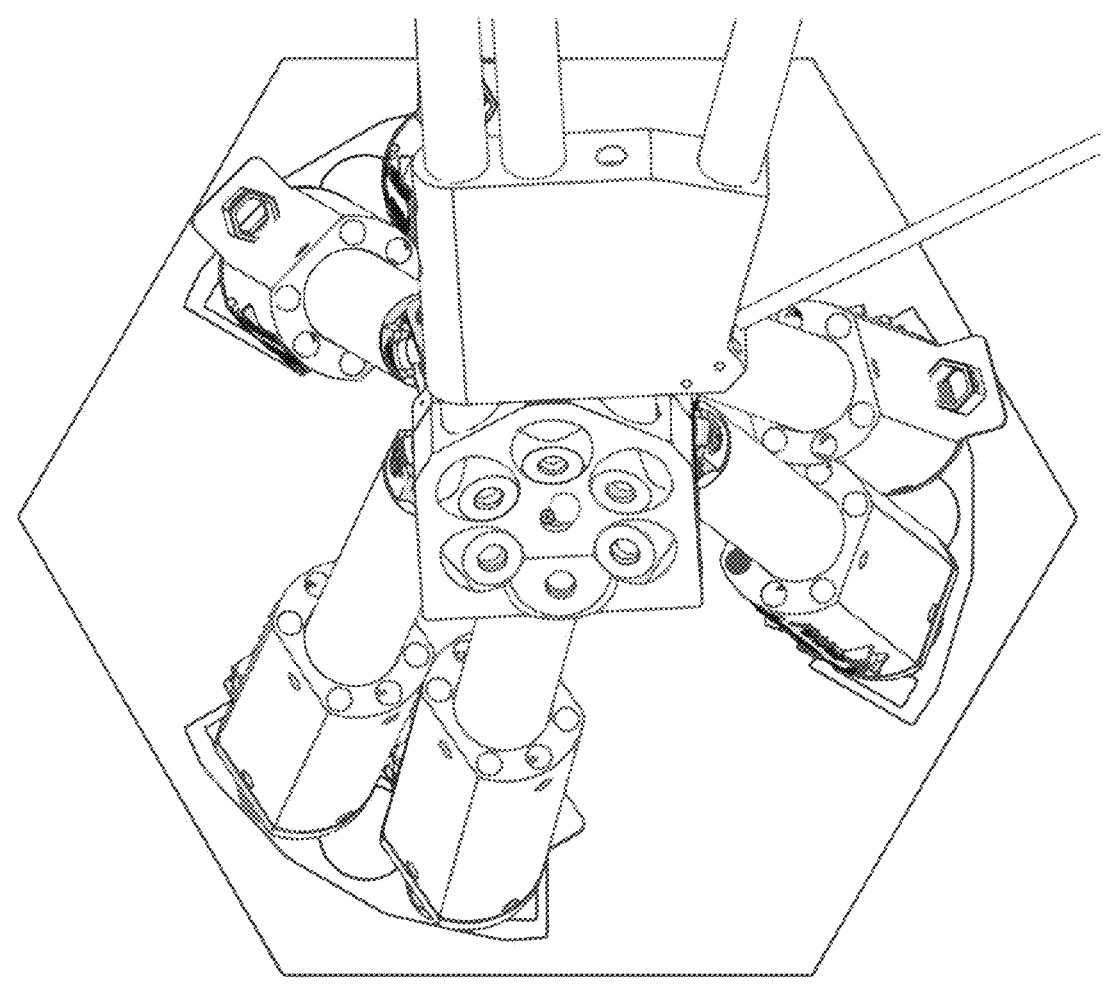
Figure 19:
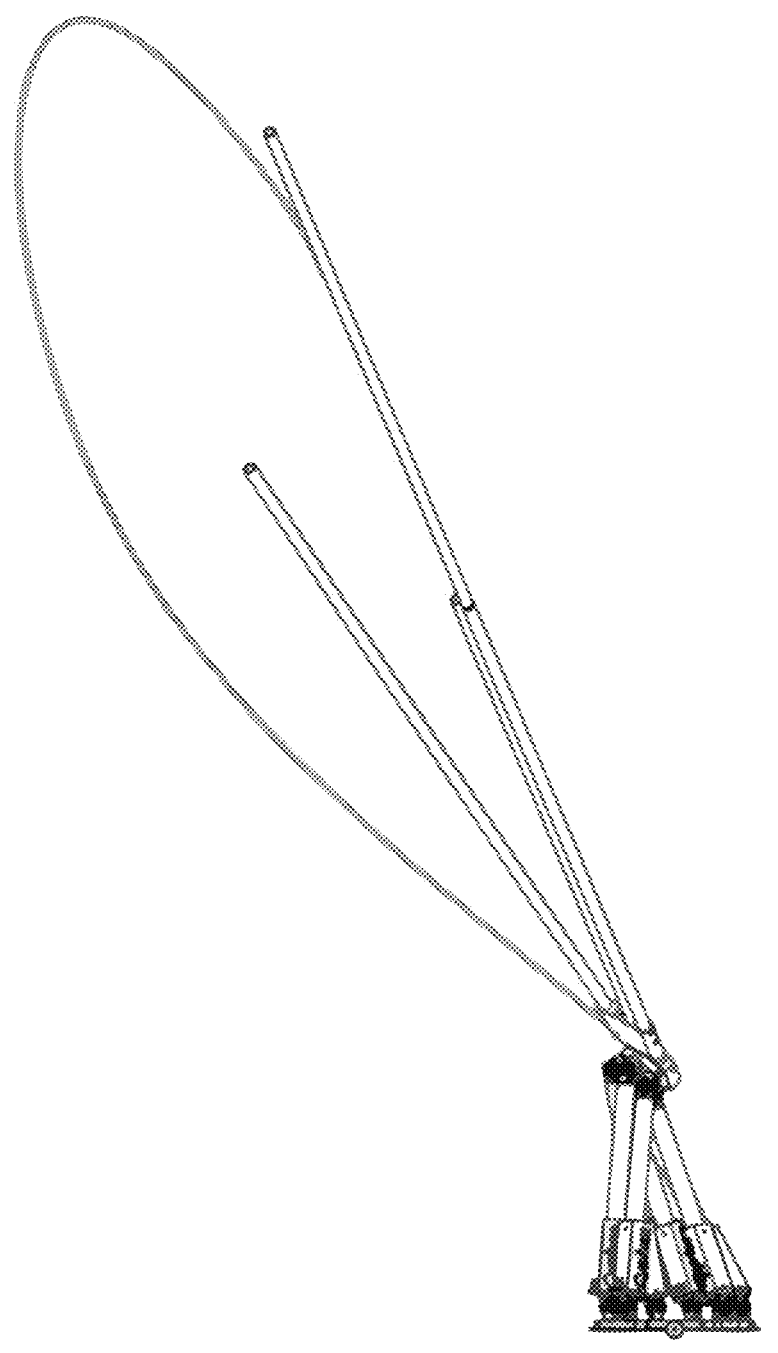
FIG. 19 is a left view of the start of thrust position.
Figure 20:
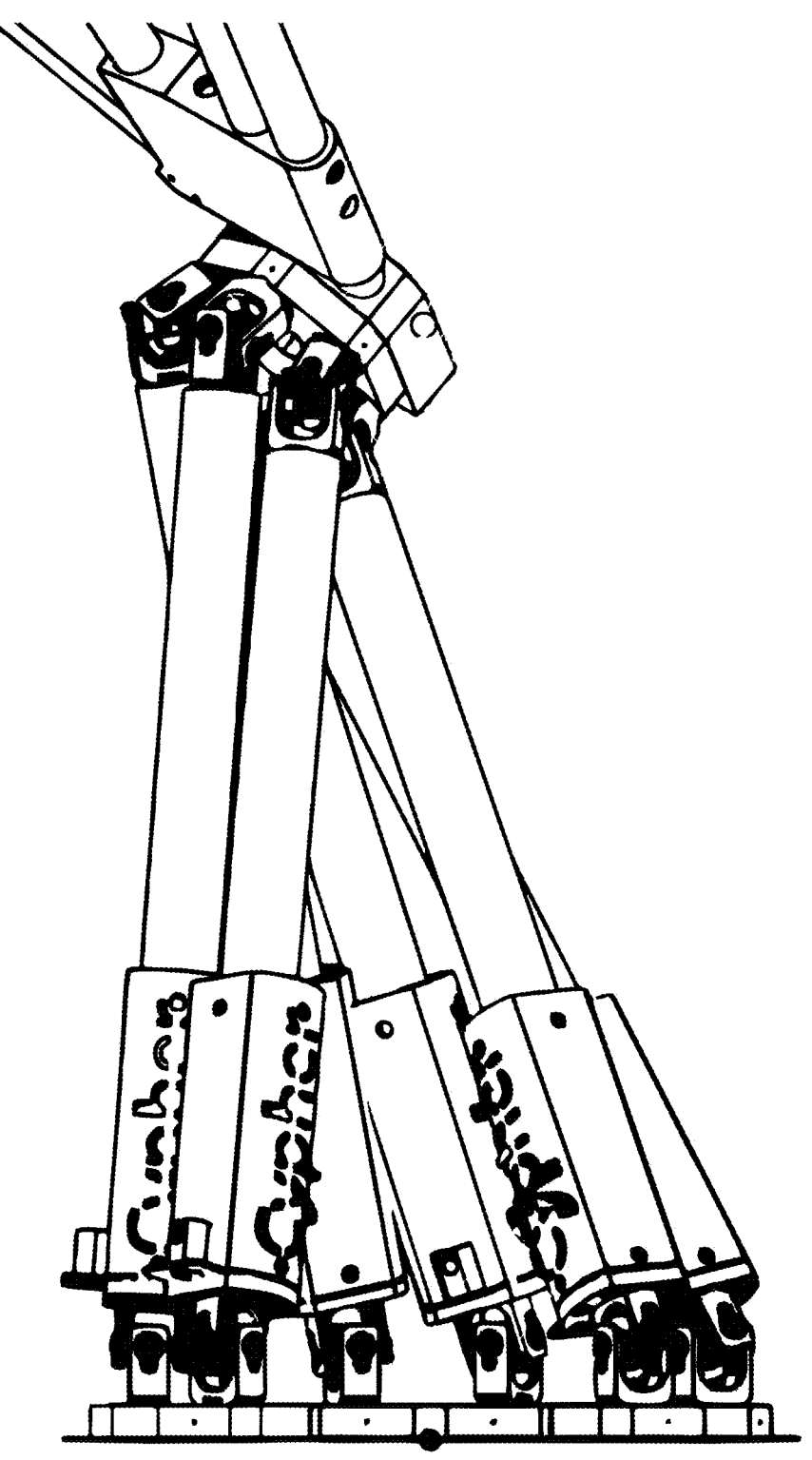
FIG. 20 is a left view of the start of the thrust position zoomed in to the actuator.
Figure 21:
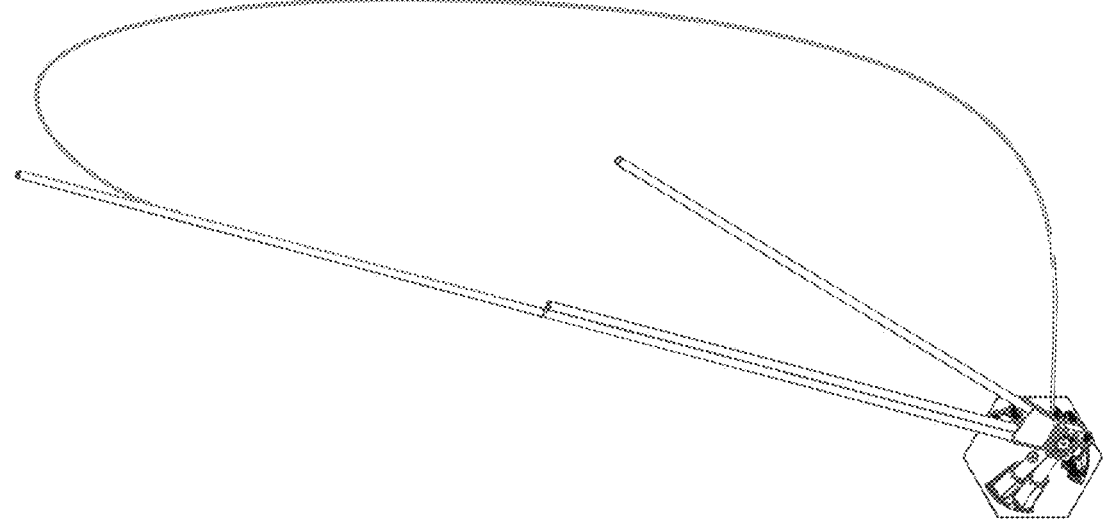
FIG. 21 is a top view of the start of the thrust position.
Figure 22:
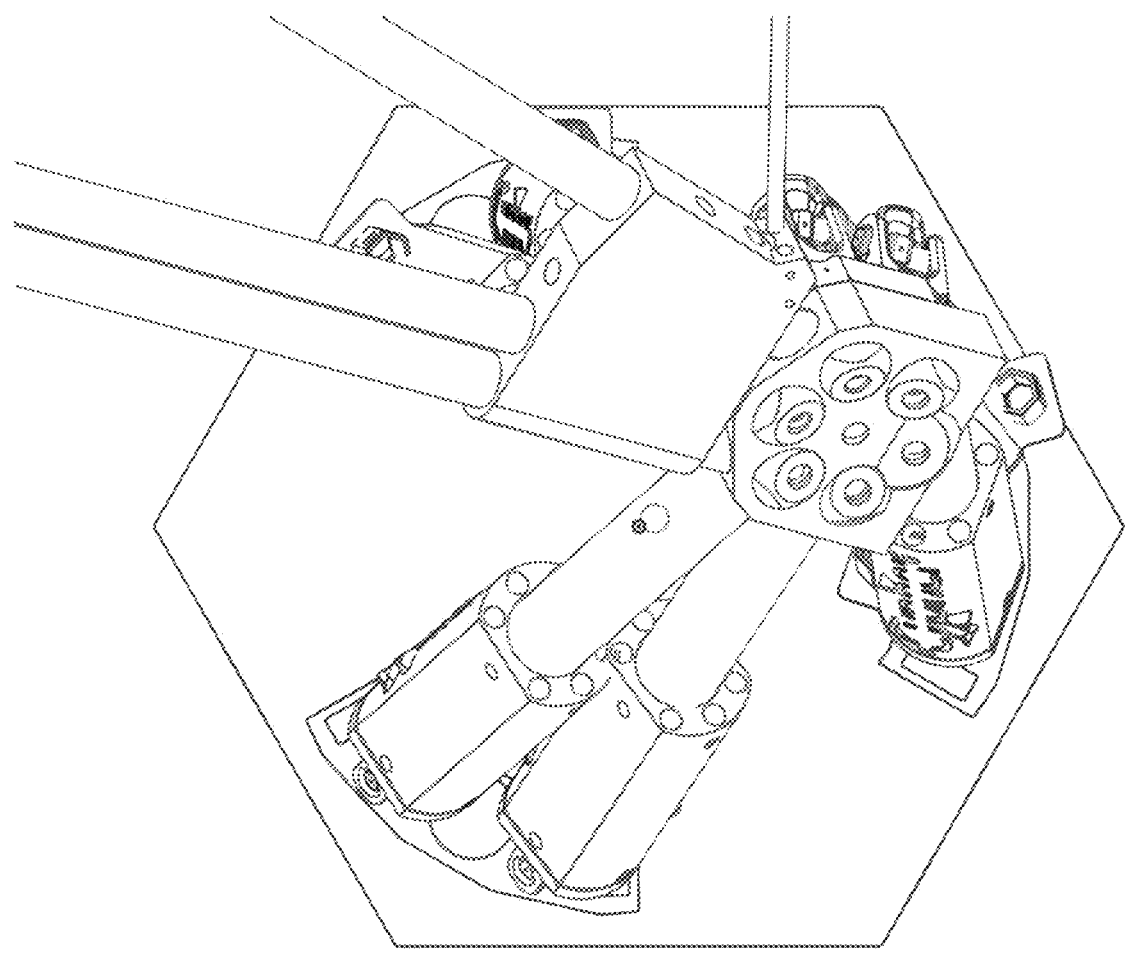
FIG. 22 is a top view of the start of the thrust position zoomed into the actuator.

As seen in FIG. 7, the actuator assembly can hold the wing 20 at a flat position where the wing 20 is horizontal. The assembly can be inverted such that the upper junction member is below the linear actuators.

The invention claimed is:

1. A wing mechanism comprising: a first actuator, wherein the first actuator extends from a substrate; a second actuator, wherein the second actuator extends from the substrate; a third actuator, wherein the third actuator extends from the substrate; an upper junction member, wherein the first actuator, the second actuator, and the third actuator connect to the upper junction member; and a wing, wherein the wing is connected to the upper junction member.

2. The wing mechanism of claim 1, wherein the wing has a wing base with a main spar mounted to the wing base.

3. The wing mechanism of claim 2, wherein the wing has a middle spar mounted on the wing base behind the main spar.

4. The wing mechanism of claim 3, wherein the wing has a trailing edge member mounted on the wing base behind the middle spar.

5. The wing mechanism of claim 4, wherein the wing has a backer spar mounted on the wing base behind the main spar.

6. The wing mechanism of claim 1, wherein the first actuator, the second actuator, and the third actuator all include a lower universal joint and an upper universal joint such that the first actuator has a first actuator lower universal joint and a first actuator upper universal joint, the second actuator has a second actuator lower universal joint and a second actuator upper universal joint, and the third actuator has a third actuator lower universal joint and a third actuator upper universal joint.

7. The wing mechanism of claim 1, wherein a median line extends from a surface of the substrate and passes between the first actuator, the second actuator, and the third actuator to the upper junction member, wherein the median line extends to the upper junction member, and wherein the wing is within 20 degrees of a right angle to the median line when in a neutral position.

8. The wing mechanism of claim 1, further including a first actuator line, wherein the first actuator line passes through the first actuator and makes a first actuator angle that is acute and angled toward the median line.

9. The wing mechanism of claim 8, further including a second actuator line, wherein the second actuator line passes through the second actuator and makes a second actuator angle that is acute and angled toward the median line.

10. The wing mechanism of claim 9, further including a third actuator line, wherein the third actuator line passes through the third actuator and makes a third actuator angle that is acute and angled toward the median line.

11. The wing mechanism of claim 1, further including a fourth actuator, wherein the fourth actuator is mounted next to the first actuator, further including a fifth actuator, wherein the fifth actuator is mounted next to the second actuator, and a sixth actuator, wherein the sixth actuator is mounted next to the third actuator, wherein the fourth actuator, the fifth actuator, and the sixth actuator are connected to the upper junction member.

12. The wing mechanism of claim 11, wherein the wing has a wing base with a main spar mounted to the wing base.

13. The wing mechanism of claim 12, wherein the wing has a middle spar mounted on the wing base behind the main spar.

14. The wing mechanism of claim 13, wherein the wing has a trailing edge member mounted on the wing base behind the middle spar.

15. The wing mechanism of claim 14, wherein the wing has a backer spar mounted on the wing base behind the main spar.

16. The wing mechanism of claim 11, wherein the first actuator, the second actuator, and the third actuator all include a lower universal joint and an upper universal joint such that the first actuator has a first actuator lower universal joint and a first actuator upper universal joint, the second actuator has a second actuator lower universal joint and a second actuator upper universal joint, and the third actuator has a third actuator lower universal joint and a third actuator upper universal joint.

17. The wing mechanism of claim 11, wherein a median line extends from a surface of the substrate and passes between the first actuator, the second actuator, and the third actuator to the upper junction member, wherein the median line extends to the upper junction member, and wherein the wing is within 20 degrees of a right angle to the median line.

18. The wing mechanism of claim 11, further including a first actuator line, wherein the first actuator line passes through the first actuator and makes a first actuator angle that is acute and angled toward the median line.

19. The wing mechanism of claim 18, further including a second actuator line, wherein the second actuator line passes through the second actuator and makes a second actuator angle that is acute and angled toward the median line.

20. The wing mechanism of claim 19, further including a third actuator line, wherein the third actuator line passes through the third actuator and makes a third actuator angle that is acute and angled toward the median line.

* * * * *